(12) United States Patent
Jäger et al.

(10) Patent No.: US 11,188,668 B2
(45) Date of Patent: Nov. 30, 2021

(54) METHOD FOR ACCESSING DATA IN A SECURE MANNER

(71) Applicant: UNISCON UNIVERSAL IDENTITY CONTROL GMBH, Munich (DE)

(72) Inventors: Hubert Jäger, Pullach (DE); Juan Quintero, Nuremberg (DE)

(73) Assignee: UNISCON UNIVERSAL IDENTITY CONTROL GMBH, Munich (DE)

( * ) Notice: Subject to any disclaimer, the term of this patent is extended or adjusted under 35 U.S.C. 154(b) by 208 days.

(21) Appl. No.: 16/670,398

(22) Filed: Oct. 31, 2019

(65) Prior Publication Data

US 2020/0104525 A1  Apr. 2, 2020

Related U.S. Application Data

(63) Continuation of application No. PCT/EP2018/060780, filed on Apr. 26, 2018.

(30) Foreign Application Priority Data

May 3, 2017 (DE) ..................... 10 2017 109 424.5

(51) Int. Cl.
*G06F 21/62* (2013.01)
*G06F 21/60* (2013.01)
*H04L 9/14* (2006.01)

(52) U.S. Cl.
CPC ........ *G06F 21/6218* (2013.01); *G06F 21/602* (2013.01); *G06F 21/604* (2013.01); *H04L 9/14* (2013.01)

(58) Field of Classification Search
CPC .. G06F 21/6218; G06F 21/602; G06F 21/604; G06F 21/6227; G06F 2221/2143;

(Continued)

(56) References Cited

U.S. PATENT DOCUMENTS 8,433,901 B2 * 4/2013 De Atley ............ G06F 21/6218
713/165
8,812,875 B1 * 8/2014 Melvin ................... G06F 21/78
713/193

(Continued)

FOREIGN PATENT DOCUMENTS

DE    11 2014 005 855 T5    8/2016

OTHER PUBLICATIONS

International Search Report issued for corresponding International Patent Application No. PCT/EP2018/060780, dated Jul. 2, 2018.

*Primary Examiner* — Meng Li
(74) *Attorney, Agent, or Firm* — Myers Wolin, LLC (57) ABSTRACT

A system and a method for accessing data in a secure manner are provided, in which the data comprises a number of data sets and each of the data sets is assigned to a user. The data sets are stored in a database in an encrypted manner, and are decryptable by means of a first decryption key assigned to the particular entity. The first decryption keys are stored in a volatile memory unit, and each of the first decryption keys are encrypted separately using a first and at least a second encryption key assigned to the particular entity, and the encrypted first decryption keys are stored in a permanent memory unit. After the volatile memory unit is erased, the encrypted first decryption keys are copied from the permanent memory unit into the volatile memory unit, and the encrypted first decryption keys are decrypted in the volatile memory unit.

9 Claims, 4 Drawing Sheets

(58) Field of Classification Search
CPC ... G06F 21/6209; G06F 21/6245; H04L 9/14; H04L 2463/062
See application file for complete search history.

(56) References Cited

U.S. PATENT DOCUMENTS

2012/0254637 A1* 10/2012 Yasaki ............... G06F 21/88
713/300
2012/0331088 A1* 12/2012 O'Hare ............. G06F 21/6227
709/214
2013/0111217 A1* 5/2013 Kopasz .............. H04L 9/3006
713/189
2016/0328890 A1 10/2016 Keane et al.

* cited by examiner

METHOD FOR ACCESSING DATA IN A SECURE MANNER

CROSS REFERENCE TO RELATED APPLICATION

The present application is a continuation of International Application No. PCT/EP2018/060780, filed on Apr. 26, 2018, and claims priority of German Application No. 10 2017 109 424.5, filed on May 3, 2017, the contents of which are incorporated herein by reference.

FIELD OF THE INVENTION

The invention relates to a method and to a system for accessing data in a secure manner. In particular, the invention relates to a method and system for continued accessing data in a secure manner after the access policies for accessing said data have been changed.

BACKGROUND OF THE INVENTION

In businesses, an increasing amount of data on customers (or other natural or legal persons) is being stored. It is known in the prior art to encrypt said customer data in this process. However, customer data of this kind is increasingly being analyzed not only by the company collecting the data itself, for example as part of big data analysis, but also by third parties.

To allow analysis that is compliant with data protection, it is known to anonymize the data. Analyses of this kind, whether by the data-collecting company or by third parties, can or should only be possible with the consent of the customer, however. In this process, the customer can give the data-collecting company explicit consent for a certain type of analysis. In this regard, it is known for it to be only possible to decrypt the data by means of a decryption key for the particular customer in order to then analyze said data. However, said decryption keys have to be made available to the data-collecting company so that practicable analysis is at all possible. Decrypting the data via the customer at the time of the analysis is not possible for purely logistical reasons.

However, the disadvantage here is that despite the customer's having only explicitly consented to only a certain type of analysis, the company can also analyze the data for other purposes, since the company is in possession of the decryption keys. Data could therefore also be analyzed in a different way without the customer's consent.

OBJECT OF THE INVENTION

The object of the present invention is therefore to avoid the drawbacks known from the prior art, in particular to provide solutions which make it only possible for analyses to be carried out for other purposes within the control of the customer or the owner of the data.

SOLUTION ACCORDING TO THE INVENTION

According to the invention, said object is achieved by a method and a system according to the independent claims. Advantageous embodiments and further developments of the invention are specified in the dependent claims. Features and details described in connection with the method according to the invention also apply in connection with the system according to the invention and vice versa; thus, with respect to the disclosure of the individual aspects of the invention, reference can always be made reciprocally.

Provided is a method for accessing data in a secure manner, wherein
  the data comprises a number of data sets, wherein
    the data sets are each assigned to an entity, preferably a user, and
    the data sets are stored in encrypted form in a database, wherein a first decryption key assigned to the particular entity is used to decrypt the data sets assigned to the particular entity,
  the first decryption keys are stored only in a volatile memory unit,
  each of the first decryption keys assigned to the particular entity are encrypted separately using a first and at least a second encryption key assigned to the particular entity, and the at least two encrypted first decryption keys which result are stored in a permanent memory unit, and
  after the volatile memory unit is erased
    the encrypted first decryption keys are copied from the permanent memory unit into the volatile memory unit, and
    in the volatile memory unit, the encrypted first decryption keys are decrypted by a first and at least a second decryption key assigned to the particular entity.

The first decryption key assigned to an entity is therefore multiply encrypted with the first and the at least second encryption key. "Separately encrypted" or "multiply encrypted" here means that the first decryption key is encrypted once with the first encryption key and is encrypted separately once with a second encryption key, resulting in two different and independent encrypted first decryption keys. Thus, it does not mean that the first decryption key is encrypted with the first encryption key and the resulting encrypted first decryption key is re-encrypted with a second encryption key.

In this way, a separate encrypted first decryption key can be generated for each purpose of a data evaluation, the keys then being stored in the permanent memory unit.

Thus, the unencrypted first decryption keys provided for decrypting the data can advantageously be deleted or destroyed, for instance if the purpose of the data analysis is changed. At the same time, however, by multiply encrypting the first decryption keys (resulting in a plurality of encrypted first decryption keys for each entity) and storing the plurality of encrypted first decryption keys, it is ensured that the first decryption keys can be restored after the owner of the data has given consent. Because a separate encrypted first decryption key is generated for each type of evaluation, the owner of the data can separately decide, for each type of evaluation, whether to recover the first decryption key. In this regard, it is particularly advantageous for big data analysis that not only can data collected in the future be analyzed according to the new purpose, but that so can the data already collected before the change in the purpose of the data analysis.

In this regard, it is advantageous if the encryption keys assigned to the particular entity for encrypting the first decryption keys and the second decryption keys assigned to the particular entity for decrypting the encrypted first decryption keys are generated together with a secret provided by the particular entity, the secret being provided by the particular entity separately for generating the encryption keys and for generating the second decryption keys. That is, the secret is provided once to generate the encryption keys and once on a separate occasion to generate the second decryption keys.

It is advantageous here if a different, i.e. another, secret is provided by the particular entity for each encryption key and for each second encryption key. This ensures that a second decryption key can be used to recover a first decryption key for a different purpose.

By providing the secret for generating the second decryption keys, the particular entity, such as a customer, can consent to the decryption of the data and to the analysis of the data according to the new purpose.

It has proved to be advantageous if the secret is discarded or deleted after each generation of the plurality of encryption keys and after the generation of the plurality of second decryption keys. This ensures that the encrypted first decryption keys cannot be restored without the consent of the particular entity.

The encryption keys can be deleted after the encryption of the first decryption keys or can be stored only in the volatile memory unit.

The second decryption keys can be deleted after the decryption of the encrypted first decryption keys or can be stored only in the volatile memory unit.

Advantageously, access to the data sets encrypted in the database is handled by an access control device, with access policies that indicate who can access the encrypted data sets and for what purpose they are to be accessed being stored in the access control device.

In this regard, it has proved to be particularly advantageous if all the contents in the volatile memory unit is deleted if the access policies are changed. This ensures that the data sets stored in encrypted form in the database cannot be accessed without the consent of the particular entity after the access policies are changed.

This is because access is only possible after the first decryption keys have been restored, which requires the consent of the particular entity. The particular entity gives this consent by providing the secret after the volatile memory unit has been erased. The specific purpose for which the first decryption keys are restored depends on which of the secrets the particular entity provides. For example, the first decryption key can be restored for the purpose Z1 with a secret S1 and the first decryption key can be restored for the purpose Z2 with a secret S2. Restoring the first decryption key for the purpose Z2 with the secret S1 is not possible here.

If the encryption keys and/or the second decryption keys are stored only in the volatile memory unit, it is thus also ensured that said keys are deleted or destroyed together with the first decryption keys, for instance if the purpose of the data analysis is changed.

It is particularly advantageous if the access control device is physically coupled to the volatile memory unit (i.e. hard-wired), with the access control device being restarted if the access policies are changed, and the volatile memory unit also being restarted on account of the physical coupling. Restarting the access control device thus causes the volatile memory unit to be restarted as well. If the volatile memory unit is restarted, all the contents in the volatile memory unit are deleted, i.e. all keys (and other data) stored in the volatile memory unit are deleted or destroyed. In addition, if the volatile memory unit is restarted, any existing back-up copies of the volatile memory unit are also deleted. Advantageously, no back-up copies (e.g. dumps) of the volatile memory unit are generated when the volatile memory unit is restarted.

It is advantageous if the database, the volatile memory unit, the permanent memory unit and the access control device are part of a secure environment. The secure environment ensures that neither the operator of the infrastructure nor any other third party can access the data. Access to the data is only possible via special interfaces. In this regard, it is advantageous if the analysis of the data (big data analysis) is also carried out in the secure environment and only the results of the analysis are outputted or leave the secure environment.

Furthermore, it is advantageous if, when the first decryption key is encrypted, an encrypted block or data block is generated, wherein the encrypted block comprises
   the first decryption key and
   metadata of the first decryption key,
wherein the metadata of the first decryption key comprise
   information on an assignment of the first decryption key
      to an entity (i.e. to the particular entity), and/or
   information about an assignment of a number of access
      policies to an entity.

The block or data block can be encrypted with an encryption key assigned to the particular entity, wherein a separate encrypted block is generated for each access policy. It is advantageous in this case that all information for decrypting the encrypted data according to an access policy are completely contained in a single block.

The invention further provides a system adapted to carry out the method according to the invention.

BRIEF DESCRIPTION OF THE FIGURES

Details and features of the invention and specific embodiments of the invention will become apparent from the following description in conjunction with the drawings, the invention not being limited to the exemplary embodiments described below. In the drawings.

DETAILED DESCRIPTION OF THE INVENTION

Figure 1:
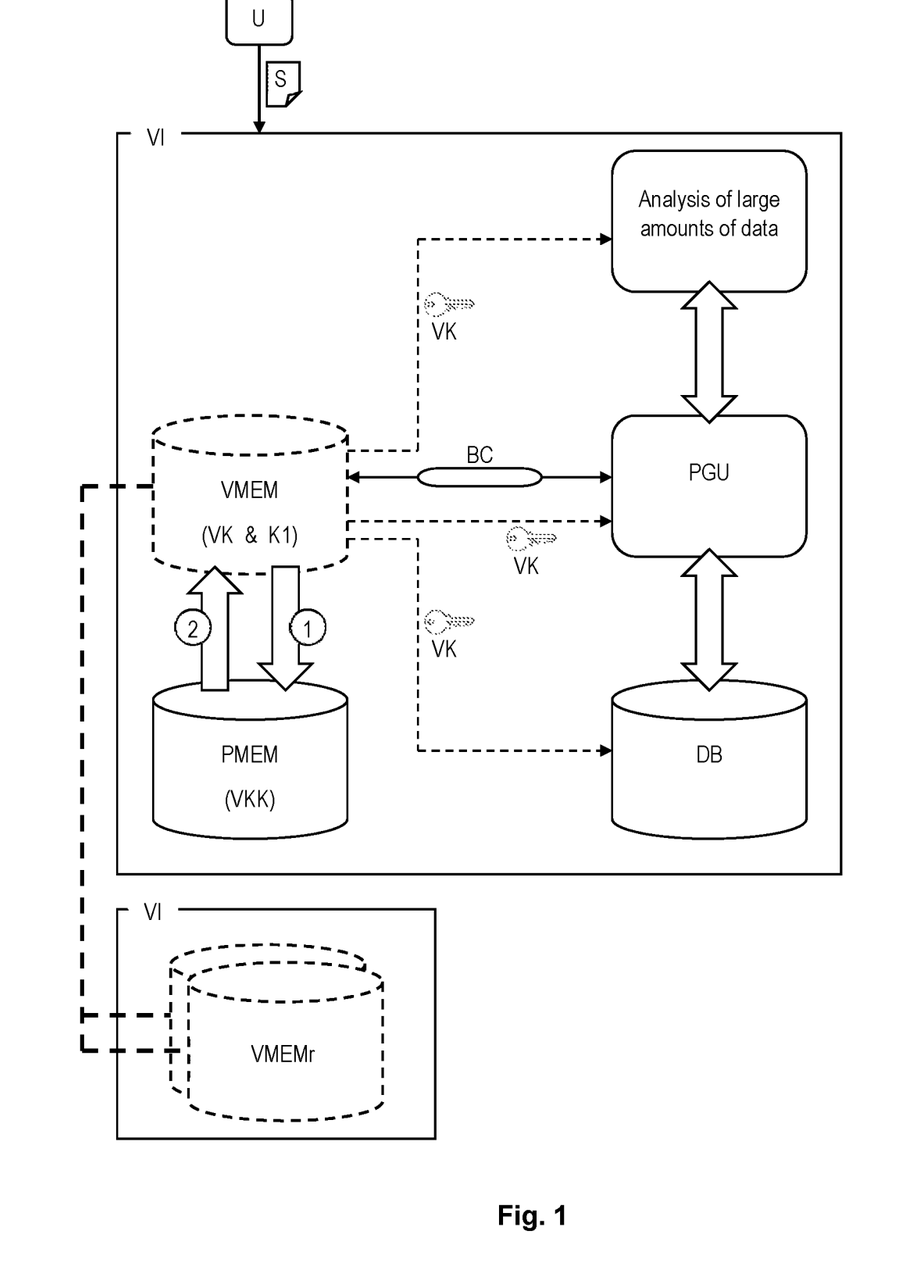
FIG. 1 shows an example of a system according to the invention for accessing data in a secure manner.

FIG. 1 shows an example of a system or an architecture according to the invention.

Data of an entity U is stored in a database DB. The entity U may be a customer of a company, a user of a system or any other natural or legal person. The entity U provides data, which is stored in the database DB. The data of the entity U may be collected in different ways. For example, the data may be transmitted from a terminal assigned to the entity U. The terminal may be a mobile phone or even a vehicle, for instance. In the case of a vehicle, vehicle data may be recorded and stored in the database. The vehicle data may include travel routes, driving style (passive/aggressive), driving times, etc., but also road damage, signage, obstacles, etc. Thus, for example, signage recorded by a sensor may be compared with signage stored in map data in order to correct erroneous map data, for instance.

Said data and other vehicle data can be used to allow long-term mobility data research.

According to the invention, access to the user-related data stored in the database DB is only intended to be possible if the particular user has consented to the corresponding use of the data.

Figure 3:
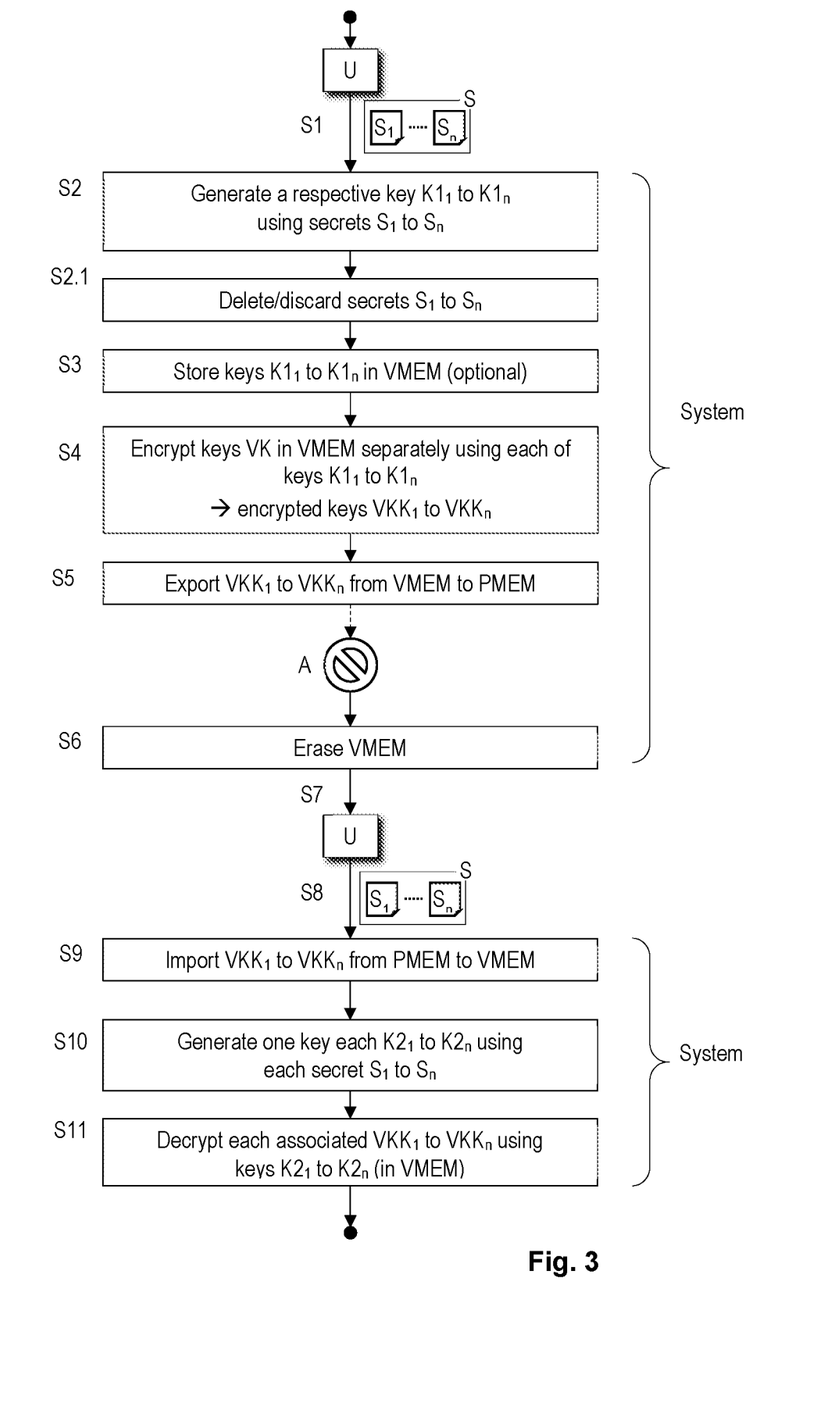
FIG. 3 shows a flow chart for an alternate version of the method according to the invention for accessing data in a secure manner.

The example below is based on a first use and a second use of the data, with the second use of the data being different from the first use of the data. The first use may be a particular first analysis of the data, for instance, and the second use may be a particular second analysis of the same data. Generally, however, the invention is not limited to two uses, but may be analogously applied to n uses, where, as shown in the example of FIG. 3, the user may agree to each of the n uses separately.

The data is stored in encrypted form in the database DB. As soon as data is first collected by an entity U, the entity has to consent to the first use. In one embodiment of the invention, the entity U may give consent before the data is first collected. Consent for the first use implies that for the decryption of the data stored in the database, corresponding first decryption keys VK are generated.

According to the invention, said first decryption keys VK are stored in a volatile memory unit VMEM. Preferably, different first decryption keys VK are assigned to each entity U.

To access the data stored in the database DB, the corresponding first decryption keys VK are read out from the volatile memory unit VMEM and transferred to the unit accessing the database. In the system shown in FIG. 1, said accessing unit may be the unit performing the analysis (big data analysis) or the access control device PGU, which monitors the access to the data in the database DB.

Alternatively, the first decryption key VK may also be made available to the database DB, which then internally decrypts the data when said data is accessed.

At the same (or almost the same) time that the first decryption keys VK are generated, they are also encrypted. To encrypt the first decryption keys VK, an encryption key K1 is required. The encryption keys K1, which are each assigned to an entity, are generated based on a secret S. Each entity U provides the system with a corresponding secret S. The secret S may be a password, passphrase, a token or any other secret information known only to the entity U. In the embodiment of the inventive method shown with reference to FIG. 3, each entity U can make several secrets $S_1$ to $S_n$ available to the system, so that a plurality of mutually independent encryption keys $K1_1$ to $K1_n$ can be generated.

As a result, the first decryption keys VK then exist in a decrypted form (VK) and in an encrypted form VKK, wherein according to the method of FIG. 3, a plurality of encrypted first decryption keys $VKK_1$ to $VKK_n$ can exist per first decryption key VK. The encrypted first decryption keys VKK (or $VKK_1$ to $VKK_n$) are then stored in a permanent memory unit PMEM, as illustrated in FIG. 1 by the arrow 1. The secret S or the secrets $S_1$ to $S_n$ are deleted or discarded after the encryption keys K1 or $K1_1$ to $K1_n$ have been generated.

The system or the particular unit accessing the database DB can now, according to the first use, read out the data from the database DB and decrypt said data using the first decryption key VK.

Now the data stored in the database DB is to be accessed according to the second use. However, the entities U have thus far only consented to the first use.

So that the entities U, or at least some of the entities U, must explicitly consent to the second use, according to the invention the first decryption keys VK stored in the volatile memory unit VMEM are deleted or destroyed. This can be achieved by erasing the volatile memory unit VMEM, for instance by cutting off the power supply to the volatile memory unit for a certain period of time (e.g. 5 seconds). This also deletes the encryption key K1. At this point in time, the system is now in a state in which the data stored in the database DB can indeed be read out, but can no longer be decrypted. This is because the first decryption keys VK stored in decrypted form in the volatile memory unit VMEM have been deleted.

If first decryption keys VK are stored or temporarily stored in the units accessing the database DB, said first decryption keys VK are also deleted or destroyed.

For example, it is possible, for reasons of performance, for a first decryption key VK provided to the access control device PGU to be stored in the access control device so that said key does not have to be re-requested from the volatile memory unit VMEM each time. In this case, the first decryption key VK stored in the access control device would also be deleted or destroyed.

According to the invention, the encrypted first decryption keys VKK are now read out from the permanent memory unit PMEM and written to the volatile memory unit VMEM, as shown in FIG. 1 by the arrow 2. So that the encrypted first decryption keys VKK can be decrypted, the particular entity U has to provide the system with the secret S again. The re-providing of the secret S can be considered to be the consent of the particular entity U for the second use of the data.

From the re-provided secret S or from the secrets $S_1$ to $S_n$, a second decryption key K2 or a plurality of second decryption keys $K2_1$ to $K2_n$ is generated in the system, with which the encrypted first decryption keys VKK or $VKK_1$ to $VKK_n$ are decrypted.

The decryption of the encrypted first decryption keys VKK preferably takes place in the volatile memory unit VMEM. After the decryption of the encrypted first decryption keys VKK, the encrypted first decryption keys VKK in the volatile memory unit can be deleted such that only the decrypted first decryption keys VK are still stored in the volatile memory unit. The encrypted first decryption keys VKK are still stored in the permanent memory unit PMEM.

Within the scope of the second use, the system can now access the data stored in the database DB, at least insofar as the entities U have consented to said second use by re-providing the secret S.

For a third and any further use of the data, the aforementioned steps are carried out again, i.e. essentially:
erasing the volatile memory unit VMEM
receiving a secret S from the entity U
generating corresponding second decryption keys K2 on the basis of the secret S
decrypting the encrypted first decryption keys VKK by means of the respective second decryption key K2, and storing the decrypted first decryption keys VK in the volatile memory unit VMEM.

Thus, the system can access the data in the context of just one single specific use, because with the renewed provision of the secret S, a user agrees to exactly one specific use.

The plurality of mutually independent encryption keys $K1_1$ to $K1_n$ and the plurality of encrypted first decryption keys $VKK_1$ to $VKK_n$ are now provided to allow a user to agree to more than one use, and thus to allow the data to be evaluated for different purposes with the consent of the user.

The encryption keys $K1_1$ to $K1_n$ with which the first respective decryption keys VK are separately encrypted are generated using the plurality of secrets $S_1$ to $S_n$ made available by the user. The results of this encryption are then the encrypted first decryption keys $VKK_1$ to $VKK_n$. Further, the plurality of second decryption keys $K2_1$ to $K2_n$ are generated using the plurality of secrets $S_1$ to $S_n$ provided by the user to the system after the volatile memory unit VMEM is erased, the second decryption keys used to decrypt the respective encrypted first decryption keys $VKK_1$ to $VKK_n$. In this case, every second decryption key $K2_1$ to $K2_n$ is provided for decrypting exactly one encrypted first decryption key $VKK_1$ to $VKK_n$.

Thus, by providing the secrets $S_1$ to $S_n$, the user can decide which encrypted first decryption keys $VKK_1$ to $VKK_n$ can be decrypted by the system. Since each encrypted first decryption key $VKK_1$ to $VKK_n$ is provided for a different purpose (purpose of using the data), by providing the secrets $S_1$ to $S_n$, the user can specify the purpose for which the data can be made accessible.

Furthermore, the system comprises an access control device PGU (policy gate unit), by means of which access to the data in the database DB is handled. On the basis of a number of access policies that may be stored in the access control device PGU, the access control device PGU determines who can access the data in the database DB and in what way. Said access policies therefore define the use of the data.

If the access policies are changed, this corresponds to a change to the use of the data.

To force the particular entities U, or at least some of the entities U, to consent to said changed access policies and thus to the changed use of the data, firstly the access control device PGU is restarted after a change to the access policies.

Secondly, the access control device PGU is physically coupled, i.e. preferably hard-wired, to the volatile memory unit VMEM (boot coupling BC) such that a restart of the access control device PGU causes a restart of the volatile memory unit VMEM.

For instance, the volatile memory unit VMEM can be restarted by cutting off the power supply to the volatile memory unit VMEM for a certain time. The contents of the volatile memory unit VMEM, and thus the first decryption keys VK, is thereby lost or deleted. Any back-up copies of the volatile memory unit VMEM are also deleted. After the restart of the volatile memory unit VMEM, the consent of the particular entity U for the continued use of the data can only be given by providing the particular secret S, as described above.

The units of the system shown in FIG. 1 may be part of a secure environment VI, which ensures that neither the operator of the system nor any other third party can access the data or keys. Access can only be gained via specially configured interfaces.

The secure environment VI may comprise a network area, at least one processing area and a memory unit area, with the network area, the processing area and the memory unit area being physically separate from one another. The network area and the processing area may be coupled to one another via an internal communication network, as may the processing area and the memory unit area.

The secure environment VI may also comprise an access controller adapted to monitor and control access to the network area, the processing area and the memory unit area, and to prevent access to unencrypted data. The access controller may comprise an access control unit and a plurality of sensor/actuator units coupled to the access control unit, wherein at least one sensor/actuator unit is assigned to each network area, each processing area and each memory unit area, each sensor/actuator unit comprising at least one sensor and/or actuator, and the access control unit being adapted to control the sensor/actuator units. The at least one sensor and/or actuator may be selected from the group consisting at least of a handle controller, a power switch, a rack sensor, a door sensor and combinations thereof.

The network area may be adapted to handle communication between the system VI and an external system (e.g. a client) via a communication network, it being possible for the network area to be further adapted to transmit and receive data in encrypted form.

It is advantageous if the processing area is adapted to receive data from the memory unit area and/or from the network area, to process the received data and to transmit the processed data to the memory unit area and/or to the network area.

The data to be transmitted to the network area may be encrypted beforehand.

This makes it possible for big data analysis to be carried out entirely within the secure environment and for only the results of the analysis to be required to leave the secure environment.

In the system according to the invention, the volatile memory unit VMEM may be designed to be redundant. For this purpose, one or more redundant volatile memory units VMEMr are provided which are coupled to the volatile memory unit VMEM via a secure network connection. The redundant volatile memory units VMEMr and the volatile memory unit VMEM may be arranged in the same secure environment VI. Alternatively, the redundant volatile memory units VMEMr may also be arranged in another secure environment VI, as shown in FIG. 1. In yet another alternative, each of the redundant volatile memory units VMEMr may be arranged in a separate secure environment.

For example, the redundant volatile memory units VMEMr may be used to restore the volatile memory unit VMEM after a system failure using the redundant volatile memory units VMEMr.

However, if the access control device PGU is restarted, not only is the volatile memory unit VMEM restarted and the keys VK stored therein deleted, but all the redundant volatile memory units VMEMr are also restarted. This means that all the first decryption keys VK stored in the redundant volatile memory units VMEMr are also deleted or destroyed.

Figure 2:
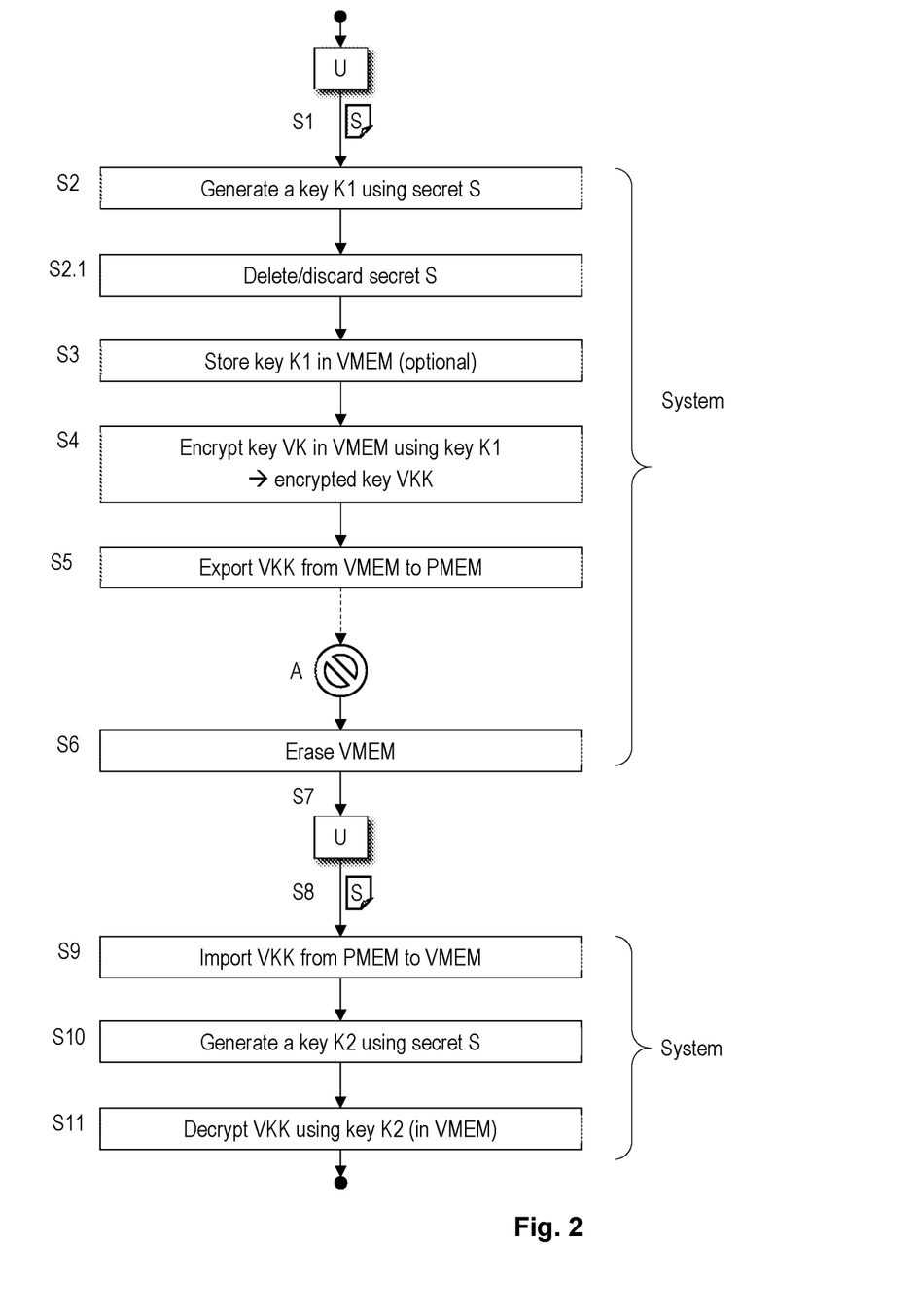
FIG. 2 shows a flow chart for a method according to the invention for accessing data in a secure manner.

FIG. 2 shows a flow diagram for an example of a method according to the invention for accessing data in a secure manner, wherein according to the method according to FIG. 2 the data can be accessed according to a single access policy—for access to the data according to several access guidelines, see the example referenced in FIG. 3.

In the flow chart of the method according to the invention, as shown in FIG. 2 it is assumed that data is already stored in encrypted form in the database DB and the corresponding first decryption keys VK for each entity U are stored only in the volatile memory unit VMEM.

In a first step S1, the entity U provides a secret S, which is made available to the system or transmitted to the system.

In a second step S2, the system generates, using the secret S, an encryption key K1 provided for encrypting the first decryption keys VK. The secret S can then be deleted or discarded (step S2.1).

Optionally, the encryption key K1 may be stored in the volatile memory unit VMEM (step S3).

In a further step S4, the first decryption keys VK assigned to the particular entity are encrypted using the encryption key K1, resulting in encrypted first decryption keys VKK. It should be mentioned at this juncture that a plurality of first decryption keys VK may be assigned to each entity. Thus, for example, new keys for encrypting the data in the database DB and thus new first decryption keys VK may be generated at regular intervals (e.g. hourly, daily or weekly) for each entity U.

The encrypted decryption keys VK are then stored in a permanent memory unit PMEM in step S5.

Steps S4 and S5 are carried out for each first decryption key VK newly generated in the volatile memory unit VMEM, preferably immediately after the generation of a new first decryption key VK. This has the advantage that at any one time, for each first decryption key VK stored in the volatile memory unit VMEM, a corresponding encrypted first decryption key VKK exists in the permanent memory unit PMEM. The volatile memory unit VMEM can thus be erased at any time without first decryption keys VK actually being lost.

It is particularly advantageous if the generation of a first decryption key VK in the volatile memory unit VMEM and in steps S4 and S5 are carried out as an atomic action. An atomic action means that the process of generating a first decryption key VK may not be interrupted until step S5 in order to avoid inconsistencies between the first decryption keys VK in the volatile memory unit VMEM and the encrypted first decryption keys VKK in the permanent memory unit PMEM.

For this purpose, the restart of the volatile memory unit VMEM, as described in connection with FIG. 1, may be delayed until the associated steps S4 and S5 have also been completed after the generation of a first decryption key VK. This delay may be achieved, for example, by a control unit or a driver of the volatile memory unit preventing the volatile memory unit from restarting until the atomic action (s) has/have been completed.

When a first decryption key VK is generated, a corresponding flag may be set in the volatile memory unit or in a register of the control unit, it only being possible to reset said flag again beginning at step S5. Only when all flags have been reset can the VMEM volatile memory unit be restarted. As an alternative to the flags, a counter may also be provided which increments up when a first decryption key VK is generated and increments down again beginning at step S5, such that the volatile memory unit VMEM cannot be restarted until the counter has the value zero or the original counter state. To avoid a deadlock or an infinite loop, no new first decryption keys VK are generated any longer after the requested restart of the volatile memory unit VMEM—only the atomic actions can be completed.

In step A, the access policy described with reference to FIG. 1 is changed, which immediately leads to a restart of the access control device PGU and thus to a restart of the volatile memory unit VMEM, the volatile memory unit VMEM preferably being configured such that all atomic actions are concluded before the volatile memory unit VMEM is restarted and thus all the first decryption keys VK stored in the volatile memory unit are deleted.

Restarting the volatile memory unit causes the volatile memory unit VMEM to be erased in step S6.

Following the restart of the volatile memory unit, the entity U is requested in step S7 to give consent to the system operator for a new/further use of the data. The consent is given by the entity U again notifying the system of the secret S in step S8.

After the re-notification/re-transmission of the secret S by the entity U, the encrypted first decryption keys VKK assigned to the entity U are copied from the permanent memory unit PMEM into the volatile memory unit VMEM in step S9.

Subsequently, a second decryption key K2 is generated in step S10 based on the retransmitted secret S, the second decryption key being used in step S11 to decrypt the encrypted first decryption keys VKK copied into the volatile memory unit VMEM. The first decryption keys assigned to the entity U are then available in decrypted form (VK) again in the volatile memory unit VMEM and can be used to decrypt the data assigned to the entity U and stored in the data DB, specifically for the further use.

This makes it possible for a user to be required to consent to the new/further use of the data and also for the already available data to be accessible for the new/further use. Furthermore, this may also prevent the data from being exposed to potential abuse due to a changed access policy, since the first decryption keys VK in the volatile memory unit VMEM are automatically deleted when the access policy is changed and said keys cannot be restored until the particular entity has given consent.

Instead of a change to a policy, the erasing of the volatile memory unit VMEM may also be triggered by an attack on the system. In this case too, the first decryption keys VK cannot be restored until the particular entity has given consent (by retransmitting the secret S).

FIG. 3 shows a flow diagram of a method according to the invention in which secure access to the data is made possible according to a plurality of different access policies.

The individual method steps substantially correspond to the method steps in FIG. 2. However, they differ in that a plurality of (different) secrets $S_1$ to $S_n$ for generating a plurality of encryption key $K_1$ to $K_n$, and for generating a plurality of second decryption keys $K2_1$ to $K2_n$ are provided or made available to the system by a user U. In addition, according to the method according to FIG. 3, a plurality of encrypted first decryption keys $VKK_1$ to $VKK_n$ are generated with the aid of the plurality of encryption keys $K_1$ to $K_n$. If, after deleting the volatile memory unit VMEM, the corresponding secrets are again provided by the user U, the sys-system can generate the second decryption keys $K2_1$ to $K2_n$ and can decrypt the respective encrypted first decryption keys $VKK_1$ to $VKK_n$ therewith.

If each encrypted first decryption key $VKK_1$ to $VKK_n$ is assigned to another access policy, by providing the secrets $S_1$ to $S_n$ the user can control which encrypted first decryption keys $VKK_1$ to $VKK_n$ can be decrypted for accessing the data. An example of this is shown in FIG. 4.

In providing the secrets for the first time, according to the method of FIG. 3, the user U can provide a small supply of secrets $S_1$ to $S_n$ (e.g. n=10 or n=20) to the system. With each of these secrets, the system can then encrypt the first decryption key VK associated with that user so that n encrypted first decryption keys VKK are generated ($VKK_1$ to $VKK_n$). Thus, a supply of encrypted first decryption key VKK can be generated, which are available for future access policy, for example.

After deleting the volatile memory unit VMEM in which the first decryption keys VK are exclusively stored, the user must then enable the system to decrypt the encrypted first decryption keys $VKK_1$ to $VKK_n$ stored in the permanent memory unit PMEM in order for the system to access the data using the respective decrypted first decryption key (=VK). For this purpose, the user U must provide the secrets $S_1$ to $S_n$ again to the system. If the user makes only a subset of the secrets (e.g. $S_1$ to $S_{n-1}$) available to the system, the system can also only restore the corresponding first decryption key VK and use it to access the data for the corresponding subset of the encrypted first decryption key (e.g. $VKK_1$ to $VKK_{n-1}$)

Figure 4:
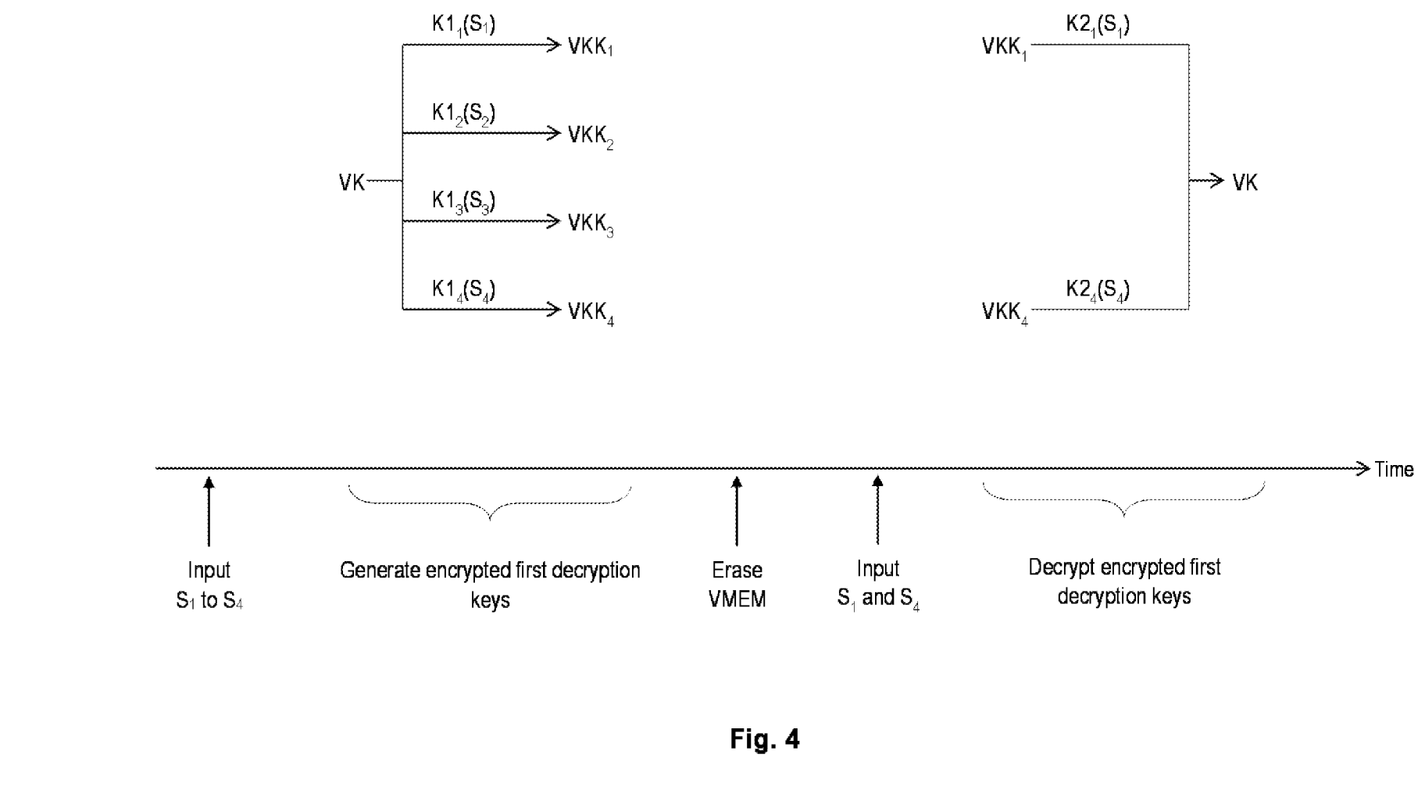
FIG. 4 shows a time sequence for a concrete example of the method according to the invention.

FIG. 4 shows a time sequence for a specific example of the method according to the invention.

First, four secrets $S_1$ through $S_4$ are input, with which user U can agree to four different access policies ($ZR_1$ through $ZR_4$), i.e. can give the system permission to access the data according to these four access policies.

Using these four secrets $S_1$ to $S_4$, four encrypted first decryption keys $VKK_1$ to $VKK_4$ are then generated from the first decryption key VK by first generating an encryption key $K1_1$ to $K1_4$ using each secret and with these encryption keys $K1_1$ to $K1_4$ then encrypting the first decryption key VK separately ($K1_1(S_1)$ to $K1_4(S_4)$).

The four encrypted first decryption keys $VKK_1$ to $VKK_4$ are then stored in the permanent memory unit PMEM.

The system can now access the data according to the four access policies using the first decryption key VK.

Each access policy may be associated with the first decryption key VK. For example, a reference to the first decryption key VK may be stored in each access policy. Alternatively, the first decryption key VK may be directly stored in each access policy.

In an advantageous embodiment of the invention, however, it may be provided that the first decryption key VK is assigned to the user U and the user U is in turn assigned 1 to n access policies ($ZR_1$ to $ZR_n$):

$$VK \leftrightarrow U \leftrightarrow ZR_1 \text{ to } ZR_n$$

The assignment $VK \leftrightarrow U$ can be realized, for example, by storing a reference to the user U in the metadata of the first decryption key VK. The metadata of the first decryption key VK are, like the first decryption key VK, also stored exclusively in the volatile memory unit VMEM. When encrypting the first decryption key VK, these metadata can also be encrypted and stored together with the encrypted first decryption key VKK (as an encrypted block containing the metadata and the first decryption key VK) in the permanent memory unit PMEM. In this way it is ensured that the assignment $VK \leftrightarrow U$ is deleted when deleting the volatile memory unit, since the assignment $VK \leftrightarrow U$ is stored exclusively in the volatile memory unit VMEM.

For the assignment $U \leftrightarrow ZR_1$ to $ZR_n$ (between U and ZR a 1:n relation is defined) is also stored exclusively in the volatile memory unit VMEM, so that this assignment is deleted when deleting the volatile memory unit. The respective encrypted block which contains the metadata and the first decryption key VK also contains the assignment to the respective access policy. In this case, the assignment to the respective access policy can be part of the metadata.

The above-described assignment $VK \leftrightarrow U \leftrightarrow ZR_1$ to $ZR_n$ has the following advantages:
- the first decryption key VK has to be stored only once in the volatile memory unit irrespective of the number of access policies for which the first decryption key VK is to be used,
- the assignment $VK \leftrightarrow U$ must also be stored only once in the volatile memory unit,
- when the first decryption key VK (from the encrypted blocks containing the metadata, the first decryption key VK and the assignment to the respective access policy) is restored, the first decryption key VK must be generated only once in the volatile memory unit, namely when the first encrypted block is decrypted,
- when decrypting the encrypted blocks, only the access policy has to be assigned to the respective user U in the volatile memory unit VMEM,
- storing the assignment $U \leftrightarrow ZR$ in the encrypted block ensures that after decrypting the block, the correct access policy is assigned to the user U,
- since only the user U knows which secret is assigned to which access policy or which secret is used to decrypt which encrypted block (which also contains the information about the access policy), after the volatile memory unit VMEM is erased the operator of the system cannot use the encrypted blocks to determine which access policies the user U originally consented to. The operator only knows which encrypted blocks are assigned to which user.

The volatile memory unit VMEM in which the first decryption key VK (and depending on the specific embodiment of the invention, the assignments $VK \leftrightarrow U$ and $U \leftrightarrow ZR_1$ to $ZR_n$) are stored is then erased.

In order to allow the system to re-access the data stored encrypted in the database DB, the user U must make the corresponding secrets available to the system again.

According to the example in FIG. 4, the user U re-provides the system with the secrets $S_1$ and $S_4$, which means that the system can access the data only in accordance with the access policies $ZR_1$ and $ZR_4$.

With the help of the newly entered secrets $S_1$ and $S_4$, the system generates two decryption keys $K2_1$ and $K2_4$. With the two decryption keys $K2_1$ and $K2_4$, the two encrypted first decryption keys $VKK_1$ and $VKK_4$ (or the encrypted blocks which contain the first decryption keys $VKK_1$ and $VKK_4$) are then decrypted. The first decryption key VK thus restored can now be used by the system to access the data according to the two access policies $ZR_1$ and $ZR_4$.

When the above-described assignments $VK \leftrightarrow U \leftrightarrow ZR_1$ to $ZR_n$ are provided, the first decryption key VK is stored in the volatile memory unit and assigned to the user U when the first encrypted block is decrypted. At the same time, the access policy specified in the encrypted block is assigned to the user U, the assignment being preferably stored in the volatile memory unit.

When decrypting the second encrypted block (and optionally the other encrypted blocks), only the access policy specified in the respective encrypted block needs to be assigned to user U.

In the example shown in FIG. 4, after the volatile memory unit is erased, the system cannot decrypt the encrypted first decryption keys $VKK_2$ and $VKK_3$ (or the corresponding encrypted blocks) since the system does not know the corresponding secrets $S_2$ and $S_3$.

LIST OF REFERENCE SIGNS

BC Boot coupling (physical coupling between the volatile memory unit VMEM and the access control device PGU)
DB Database in which the data is stored (in encrypted form)
K1, $K1_1$-$K1_n$ Encryption key for encrypting the first decryption keys VK
K2, $K2_1$-$K2_n$ Second decryption key for decrypting the encrypted first decryption keys VKK
PGU Access control device (policy gate unit)
PMEM Permanent memory unit
S, $S_1$-$S_n$ Secret, e.g. password, token, etc.
S1-S11 Steps of the method according to the invention
U Entity to which the data belongs, such as a user
VI Secure environment
VK First decryption key for decrypting the data
VKK, $VKK_1$-$VKK_n$ Encrypted first decryption key VK
VMEM Volatile memory unit
VMEMr Redundant volatile memory unit VMEM

The invention claimed is:

1. Method for accessing data in a secure manner, the method comprising:
   the data comprises a number of data sets, wherein
      each of the data sets is assigned to an entity (U), preferably a user, and
      the data sets are stored in encrypted form in a database (DB), wherein a first decryption key (VK) assigned to the particular entity (U) is used to decrypt the data sets assigned to the particular entity,
   the first decryption keys (VK) are stored in a volatile memory unit (VMEM),
   each of the first decryption keys (VK) assigned to the particular entity (U) are encrypted using a first and at least a second encryption key (K1) assigned to the particular entity (U) (S4), and the at least two encrypted first decryption keys (VKK) resulting therefrom are stored in a permanent memory unit (PMEM) (S5), and
   after the volatile memory unit (VMEM) is erased (S6)
      the encrypted first decryption keys (VKK) are copied from the permanent memory unit (PMEM) into the volatile memory unit (VMEM) (S9), and
      in the volatile memory unit (VMEM), the encrypted first decryption keys (VKK) are decrypted by a first and at least a second decryption key (K2) assigned to the particular entity (U).

2. The method of claim 1, wherein each of the encryption keys (K1) assigned to the particular entity (U) and the second decryption keys (K2) assigned to the particular entity (U) are generated using a secret (S) provided by the particular entity (U), wherein the secret (S) is provided by the respective entity (U) separately for generating the encryption keys (K1) (S1) and for generating the second decryption keys (K2) (S8), wherein the entity (U) provides a different secret (S) for each encryption key (K1) and for each second decryption key (K2).

3. The method of claim 2, wherein each secret (S) is discarded or deleted after the generation (S2) of the encryption keys (K1) and after the generation (S10) of the second decryption keys (K2) (S2.1; S10.1).

4. The method of claim 1, wherein each of the encryption keys (K1) are deleted or stored only in the volatile memory unit (VMEM) after the encryption (S4) of the first decryption keys (VK).

5. The method of claim 1, wherein each of the second decryption keys (K2) are deleted or stored only in the volatile memory unit (VMEM) after the decryption (S11) of the encrypted first decryption keys (VKK).

6. The method of claim 1, wherein access to the data sets encrypted in the database (DB) is handled by an access control device (PGU), wherein access policies indicating who can access the encrypted data records and for what purpose are stored in the access control device (PGU).

7. The method of claim 1, wherein all contents in the volatile memory unit (VMEM) are deleted if the access policies are changed.

8. The method of claim 7, wherein the access control device (PGU) is physically coupled to the volatile memory unit (VMEM), wherein if the access policies are changed, the access control device (PGU) is restarted, the volatile memory unit (VMEM) is also restarted on account of the physical coupling, and the first decryption keys (VK) stored in the volatile memory unit (VMEM) are deleted.

9. The method of claim 1, wherein when encrypting the first decryption key (VK) an encrypted block (data block) is generated, wherein the encrypted block comprises:
   the first decryption key (VK), and
   metadata of the first decryption key (VK),
   wherein the metadata of the first decryption key comprise:
      information about an assignment of the first decryption key (VK) to an entity (U), and/or
      information about an assignment of a plurality of access policies to an entity (U).

* * * * *